United States Patent [19]
Johnson et al.

[11] Patent Number: 4,792,955
[45] Date of Patent: Dec. 20, 1988

[54] APPARATUS FOR ON-LINE CHECKING AND RECONFIGURATION OF INTEGRATED CIRCUIT CHIPS

[75] Inventors: David B. Johnson, Portland; Stanley Kenoyer, Forest Grove; Mark S. Myers, Portland, all of Oreg.; Sven Nilsson, Deisenhofen, Fed. Rep. of Germany

[73] Assignee: Intel Corporation, Santa Clara, Calif.

[21] Appl. No.: 898,522

[22] Filed: Aug. 21, 1986

[51] Int. Cl.⁴ .............................................. G06F 11/20
[52] U.S. Cl. .......................................... 371/68; 371/9
[58] Field of Search ............... 371/9, 11, 68; 364/200, 364/187

[56] References Cited

U.S. PATENT DOCUMENTS

| | | | |
|---|---|---|---|
| 3,303,474 | 2/1967 | Moore et al. | 371/9 X |
| 4,012,717 | 3/1977 | Censier et al. | 364/200 |
| 4,412,280 | 10/1983 | Murphy et al. | 364/200 |
| 4,412,281 | 10/1983 | Works | 364/200 |
| 4,634,110 | 1/1987 | Julich et al. | 371/9 X |

Primary Examiner—Charles E. Atkinson
Attorney, Agent, or Firm—Owen L. Lamb

[57] ABSTRACT

An error-checking system in which two substantially identical modules are checked by comparing the outputs (43, 63) from the chip logic (41, 61) on each modules with each other. One module is designated a master and the other module is designated a checker. The compare logic (46 or 66) is functional only when the module that it is on is designated as the checker. A control bit designates a module as either a master or a checker. A second control bit indicates when in a first state, that a module designated as a master drives the bus, and when in a second state that a module designated as a master and a module designated as a checker alternately drive the bus. Circuitry distinguishes a warm initialization from a cold initialization. A bit in a register causes a module designated as a master to become a checker upon every alternate warm initialization, so that the module alternates between being a master and a checker only each time a warm initialization occurs.

1 Claim, 3 Drawing Sheets

APPARATUS FOR ON-LINE CHECKING AND RECONFIGURATION OF INTEGRATED CIRCUIT CHIPS

TECHNICAL FIELD

This invention relates to data processing systems, and more particularly, to means for reconfiguring a data processing system when a failure is detected in an integrated circuit chip.

BACKGROUND ART

In prior multiprocessing systems fault-handling mechanisms are provided which include error detection, diagnosis, logging, and reporting of the fault to higher levels of the system. System resources detect the presence and extent of the failure and pass this information to recovery mechanisms. The recovery mechanisms are employed, after fault detection, to activate redundant components to take over operations previously handled by the faulty component. An example of such a system is described in the following patents, all of which are assigned to Intel Corporation:

U.S. Pat. No. 4,438,494 "Method and Apparatus of Fault Handling in a Multiprocessing System" by David Budde et al, filed on Aug. 25, 1981;

U.S. Pat. No. 4,503,534 "Apparatus for Redundant Operation of Modules in a Multiprocessing System" of David Budde et al, granted on Mar. 5, 1985; and U.S. Pat. No. 4,503,535 "Apparatus for Recovery from Failures in a Multiprocessing System" of David Budde et al, granted on Mar. 5, 1985.

In these prior patents, appropriate response to hardware-error conditions is based upon a confinement area concept which partitions the interconnect system of the multiprocessor into a number of areas. The confinement areas provide error-detection mechanisms appropriate to deal with the kind of information flowing across the confinement area boundaries.

There is a confinement area for each module and memory bus in the system. A detected error is confined to one of the system building blocks. This allows a recovery mechanism to effectuate the replacement of system building blocks. Detection mechanisms reside at every interface, such that all data is checked as it flows across the interface between confinement areas. Error detection within a confinement area is performed by duplicating components as described in U.S. patent application No. 4,176,258 of Daniel Jackson, granted on Nov. 27, 1979 and assigned to Intel Corporation. In the Jackson patent, detection of errors is accomplished by a redundancy method known as functional redundancy checking (FRC), in which a component is duplicated and output signals from the two identical components are compared.

Functional redundancy checking is not very effective as a recovery mechanism, but for many users it is important to keep the system running, even though there is a risk that the data will lack integrity. For these users it is desirable to be able to reconfigure the system to keep it running when one of the components has failed as a result of a functional redndancy check, even if there is a loss of data integrity.

It is therefore an object of this invention to provide a redundant module checking system in which a faulty module can be taken out of the system and the system reconfigured to operate with the nonfaulty module.

DISCLOSURE OF THE INVENTION

Briefly, the above object is accomplished in accordance with the invention by duplicating modules in the system with one module assuming the role of a master while the other module assumes the role of a checker, such that both modules form a single logical module. The two modules run in lock step and at every step the checker ensures that it has computed the same results as the master. When an error occurs as a result of a non-comparison of the results from the two modules, a permanent error bit is turned on and the master module is selected as the active component. On a subsequent initialization sequence, the modules toggle the active state such that the checker becomes the active module on the second, fourth, etc. initializations, and the master becomes the active module on the third, fifth, etc. initializations. The component that is the checker has a passive bit set, which prevents it from driving the system bus or the error-reporting lines.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

BEST MODE FOR CARRYING OUT THE INVENTION

Figure 1:
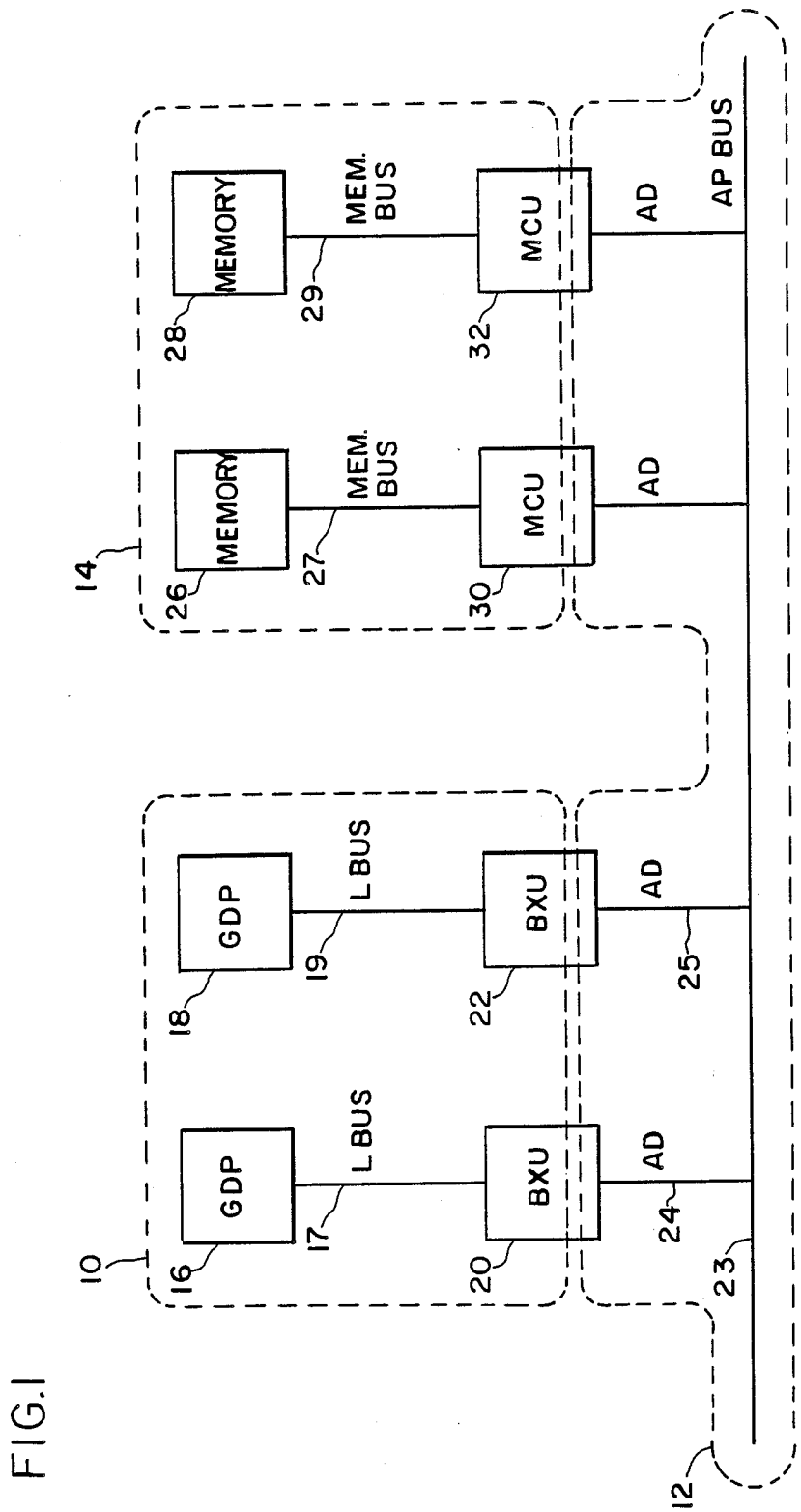
FIG. 1 is a diagram of a multiprocessing system in which the checking mechanism of the present invention is embodied; and, FIG. 2 is a diagram of the functional redundancy checking logic utilized in the BXU component shown in FIG. 1.

FIG. 1 is a diagram of a multiprocessing system in which the checking mechanism of the present invention is embodied. The broken lines indicate the confinement areas (10, 12, 14) in this typical computational subsystem (CS). Within the confinement area (10) there are two identical general data processors or GDP's (16, 18) connected to bus expander units or BXU's (20, 22) via a local bus or LBUS (17, 19). The BXU's attach to an advanced processor (AP) bus (23) via address/data (AD) lines. Within the confinement area (14) there are two identical memory components (26, 28) connected to memory control units (30, 32) via a memory bus (27, 29). The MCU's attach to the AP bus (23) via address-/data (AD) lines. The detection of bad data at the confinement area boundaries is done by Functional Redundancy Checking (FRC). A module (eg. a GDP/BXU pair) is duplicated with one copy (16, 20) assuming the role of master, while the other (18, 22) assumes the role of checker; both copies forming a single logical module (10) that is said to be FRC'd. The two copies of the module run in lock step and at every step the checker ensures that it has computed the same results as the master. The FRC checking is done by the BXU that is the interface from the module to the system AP bus to which it is interfaced. On every clock cycle the BXU (22) designated as checker compares its AD bus pins (33) to the corresponding pins of the BXU (20) designated as master with which it is paired. If a disagreement is detected, then an error has occurred and the checker reports this fact.

Running two modules in lock step requires special consideration in the component design. The first requirement is that the components have a reset signal and/or "sync" interagent communication (IAC) signal transmitted over the LBUS that allows the two components to have internal states set to the same values. Second, all signal inputs must be synchronous or these inputs must be sunchronized to the system clock (CLK) before being fed to the component pins. Lastly, during normal operation, the operation of the two modules in the FRC configuration must proceed in lock step. Software participates in recovery by isolating the faulty module and restarting the system without the failed unit. This is a low cost method since it uses alternate, resources.

The alternate resource is the working module of an FRC pair. When an FRC'd pair reports an error, the error report isolates to the pair, but not to the one faulty component of the pair. Diagnostic software uses the self-test and testability facilities in the paired components to determine which module is faulty and then configures it out of the system. This is called "FRC splitting."

FRC splitting is achieved at reinitialization after the failure. Hardware allows the failed module in the pair to become quiescent and the functional module to continue operation. If the FRC splitting mode is set active in an FRC'd component on the AP bus (i.e., a BXU), then the next warm INIT will cause the former master component (20) to become quiescent (passive checker) while the former checker component (22) becomes a master (active master). Successive warm INITs will cause the components to exchange their roles, each alternately becoming a quiescent and letting the other be the active master. This allows diagnostic software to select the good BXU in the pair (and hence the good module) for continued operation. Providing this capability requires a single arbitration line on the AP bus for masters and checkers.

This form of recovery is enabled after an INIT. It may be disabled by software via the FRC SPLITTING DISABLE bit in the FRC Splitting Control (FSC) register, described below.

FRC splitting only occurs in conjunction with an INIT sequence. Thus, before this recovery can begin, there needs to be intervention by software signaling external support logic to send a local INIT. Alternatively a watchdog timer may notice that the system has crashed and may start an INIT sequence. An INIT sequence may also be started manually by pushing the INIT button on the system panel.

When a permanent error is reported each BXU will set a PERMANENT ERROR bit in a register. Recovery using FRC splitting does not happen, however, as a direct result of an error report. FRC splitting happens as part of a warm INIT sequence. Thus, this recovery approach is not transparent to the user or the software system. Also, because FRC splitting eliminates the FRC error checking in the module, diagnostic software plays a role in the trial-and-error sequence that determines which half of the module is operating correctly.

If the confinement ID field in the error report matches the confinement ID field in the module error ID register AND the MARRIED bit in the QMR register is zero than the MY PERMANENT ERROR bit in the FSC register will be set. The fault tolerant (FT) logic will shut down this module in the same manner as for module errors. Thus, the faulty module is cut-off from the system, but it puts the BXUs in the faulty module in a position to execute FRC splitting on the next warm INIT if that form of recovery is enabled.

FRC splitting will occur when:

A WARM INIT occurs
AND
FRC SPLITTING DISABLE in the FSC register is cleared
AND
MY PERMANENT ERROR in the FSC register is set.

If FRC splitting occurs, the SEPARATED M/C bit in the FSC register will be set.

The last thing the BXU hardware does is to select either the master or checker as the active component. When FRC splitting first occurs, the master will be selected as the active component. On subsequent WARM INITs, the components will toggle the active state. Thus, the checker will be active on the second, fourth, etc. INITs, and the master will be active on the third, fifth, etc. INITs.

The initialization for components in the system uses a duplicated INIT signal line to provide protection against failures of the INIT lines. The local intelligence on each board in the form of the parameter controller (a microcontroller), decides when the INIT lines are broken. At cold start, the parameter controller allows the components to be initialized if either one of the INIT lines is asserted. However, during a warm start, the parameter controller allows the board to be initialized only if both INIT lines are asserted. This ensures that a cold start the system is able to be initialized in spite of a single failure in the initialization network. However, while the system is running a transient, intermittent, or hard failure on one of the INIT lines is not allowed to abruptly reinitialize an otherwise failure-free, running system. If an INIT line suffers a hard failure, then no warm starts are possible until it is repaired. In the interim, the system must be manually cold started.

Figure 2:
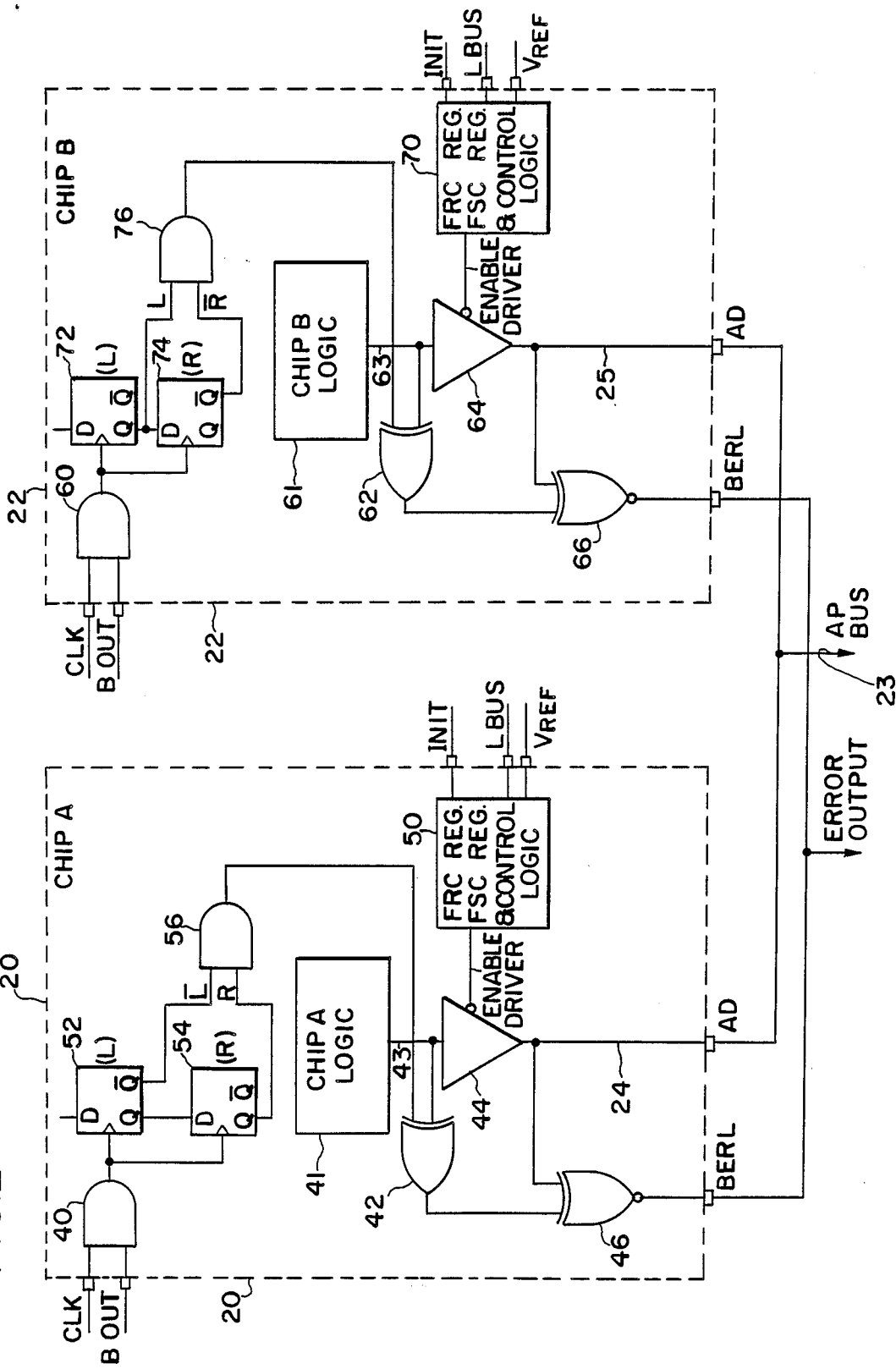

FIG. 2 is a diagram of the FRC logic for a single bit, for simplicity and ease of understanding. It will be readily understood by those skilled in the art that the circuitry can be replicated to check multiple bits. The following chip input pins are used for the FRC splitting function:

Bus Error: BERL

The BERL lines are used to signal errors and are wire-or signals. The error reporting mechanism is more fully described in the above-referenced patents.

Initialization Signal: INIT

The INIT signal forces all components to reset and synchronize. The bus cycle begins the first system clck (CLK) period after INIT is asserted. All components recognize this and will remain in synchronization thereafter.

Bus Output Control: BOUT

BOUT is asserted whenever a component is driving the AP bus.

Address/data lines: AD

The AD lines carry address and data information between tha BXU and the AP bus. Local Bus: LBUS The local bus pins carry control and data information from the General Data Processor (GDP) to the component. Software running on the GDP sets and resets the control registers on the component via information sent over the LBUS.

Chip A (20) has logic (41) fabricated thereon with its output connected to exclusive NOR (42) and to the input of a three-state driver (44). The three-state driver has an enable input which is connected to control logic (50). The outputs of the exlusive NOR (42) and the driver (44) are each connected to another exclusive NOR (46). When the enable driver input is energized, the driver (44) is disabled so that no data passes therethrough.

A test circuit (40, 52, 54, 56) is provided on the chip to force an error in the FRC circuitry so that a check can be made. BOUT and CLK are combined in AND (40) so that when BOUT is energized, clock pulses will be supplied to a shift chain (52, 54) which is actually part of the COM register. The COM register is in the control block (50), and is described below. The outputs of the shift chain drive AND (56), the output of which drives the other input of exclusive NOR (42). The manner by which this circuitry checks the logic is described below.

The chip B (22) is identical to chip A (20). Chip B logic (61) has its output connected to exclusive NOR (62) and to the input of a three-state driver (64). The three-state driver has an enable input which is connected to control logic (70). The outputs of the exclusive NOR (62) and the driver (64) are each connected to another exclusive NOR (66). When the enable driver input is energized the driver (64) is disabled so that no data passes therethrough.

A test circuit similar to the one described above with respect to chip A is provided on chip B to force an error in the FRC circuitry so that a check can be made. BOUT and CLK are combined in AND (60) so that when BOUT is energized, clock pulses will be supplied to the shift chain (72, 74) which is part of the COM register in control block (70). The outputs of the shift chain drive AND (76), the output of which drives the other input of exclusive NOR (62).

The COM, FRC, and FSC registers associated with the FRC functions are contained within each of the logic blocks (50) and 70) and are described below.

COM Register

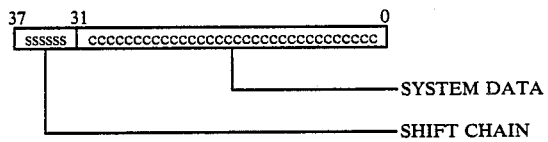

The COM register uses a serial protocol such that bits are loaded via the COM pin which is part of the LBUS.
SYSTEM DATA This 32bit register is used for testing and parameterization functions, and defaults to zero at INIT.
SHIFT CHAIN:

These 6 bits are hidden and are part of the shift chain used for testing the FRC logic shown in FIGURE 2.

The shift chain (52, 54) activates one bit in the interface for testing. This bit is internally corrupted and should result in an FRC error being indicated on that FRC error reporting line (BERL). Fault-handling logic uses the truth table shown below in Table I to determine if an error condition exists. If everything is functioning normally, one line will indicate an error, and the other will indicate OK. All other conditions indicate either a failure in the FRC logic, or a disagreement between master (20) and checker (22). No error report will be generated by this test unless an error condition exists.

TABLE I

| TEST LEFT | TEST RIGHT | LEFT FRC LINE | RIGHT FRC LINE | RESULT |
|---|---|---|---|---|
| 1 | 0 | 0 | 0 | ERROR |
| 1 | 0 | 0 | 1 | ERROR |
| 1 | 0 | 1 | 0 | OK |
| 1 | 0 | 1 | 1 | ERROR |
| 0 | 1 | 0 | 0 | ERROR |
| 0 | 1 | 0 | 1 | OK |
| 0 | 1 | 1 | 0 | ERROR |
| 0 | 1 | 1 | 1 | ERROR |

To initiate the automatic FRC testing in a component, software must: (a) write the COM register of the component with any value containing a single 1 bit, and (b) set the ENABLE TESTING bit in the TEST DETECTION register of the component. The TEST DETECTION register is located in the logic clock (50).

FRC SPLITTING CONTROL REGISTER

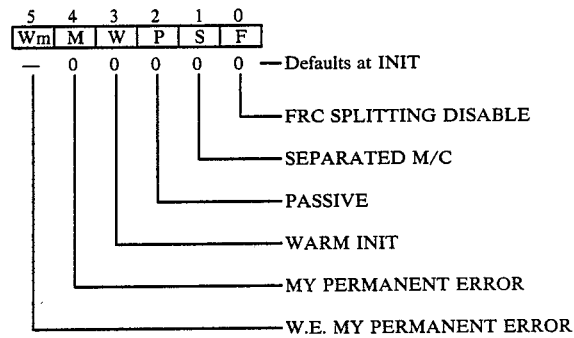

FRC SPLITTING DISABLE
1 = The FRC splitting logic is disabled.
0 = Pursue FRC splitting sequence on the next INIT following a permanent error in this module.
SEPARATED M/C
1 = The Master/Checker pair are operating as two independent components.
0 = FRC checking is enabled on all FRC'd pins.
PASSIVE
1 = This component is passive. It cannot drive the AP bus or error reporting lines.
0 = This component is active in normal operation.
WARM INIT
1 = The last INIT was a warm INIT
0 = The last INIT was a cold INIT
MY PERMANENT ERROR
1 = This module has reported a permanent error.
0 = This module has not reported a permanent error.
W.E. MY PERMANENT ERROR
1 = A register write to the MY PERMANENT ERROR bit is enabled.
0 = The MY PERMANENT ERROR bit will not be altered by a register write.

FRC REGISTER

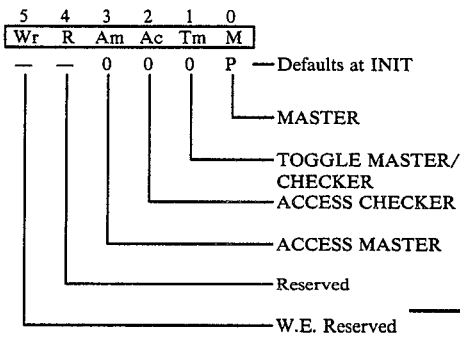

Master
1 = This agent is either the master of a master/checker pair, or there is no M/C pair.
0 = This agent is the checker.
If the COM# pin on the LBUS is high at INIT, then this bit is set (this component will be a master). This bit is read only and is never changed by the hardware.
Toggle Master/Checker
This bit defaults to a "0."
1 = Masters and checkers alternate driving the bus on cycle boundaries.
0 = Masters always drive the bus.
Access Checker and Access Master
See the QMR register below for the usage model for these bits.

QMR REGISTER

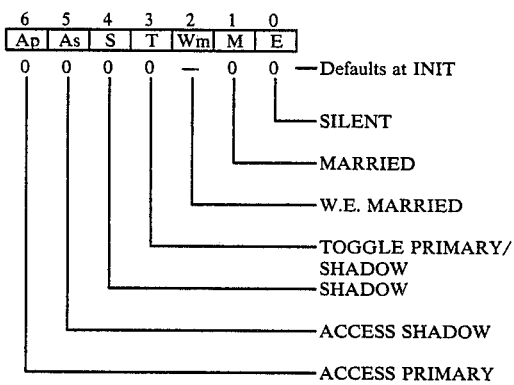

SILENT:
1 = This component will not reply to requests issued to either the memory or logical IAC address space. The TOGGLE P/S bit must be cleared when the SILENT bit is set.
0 = Normal operation.

This bit defaults to a value of zero at initialization. This bit is required for the MCU. It may or may not be used in on-line repair of BXU-based memory modules.
MARRIED:
1 = This FRC pair is married to another FRC pair.
0 = This FRC pair is not married.
This bit defaults to a value of "0" at initialization.
W.E. MARRIED:
1 Register writes affect the MARRIED bit.
0 = Register writes do not affect the MARRIED bit.
The states of the control bits in the two BXU's during an FRC splitting situation are shown in Table II below.

TABLE II

| Control Bit (Register) | Original State | | State on 1st, 3rd, 5th INIT | | State on 2nd, 4th, 6th INIT | |
|---|---|---|---|---|---|---|
| | Master | Checker | Master | Checker | Master | Checker |
| MASTER- FRC | 1 | 0 | 1 | 0 | 1 | 0 |
| Active Compon. | x | x | 1 | 0 | 0 | 1 |
| TOGGLE M/C-FRC | x | x | 0 | 0 | 0 | 0 |
| PASSIVE-FSC | 0 | 0 | 0 | 1 | 1 | 0 |
| Separ. M/C-FSC | 0 | 0 | 1 | 1 | 1 | 1 |

It is the setting of the PASSIVE bit in the FSC register that prevents the passive component from driving the AP bus or the error reporting lines. After the PASSIVE bit is set, the passive component will continue to respond to IAC messages addressed to it, so that software can reunite a split pair.

For FRC splitting to work both the master and checker must be connected to the same set of arbitration lines. This is required so that either the master or the checker can act as the sole active component for the module. If the arbitration lines were duplicated, then the two arbitration lines would always be different after an FRC split because the split module would only be arbitrating on one of the two arbitration networks.

Cold/Warm Start Distinction

Figure 3:
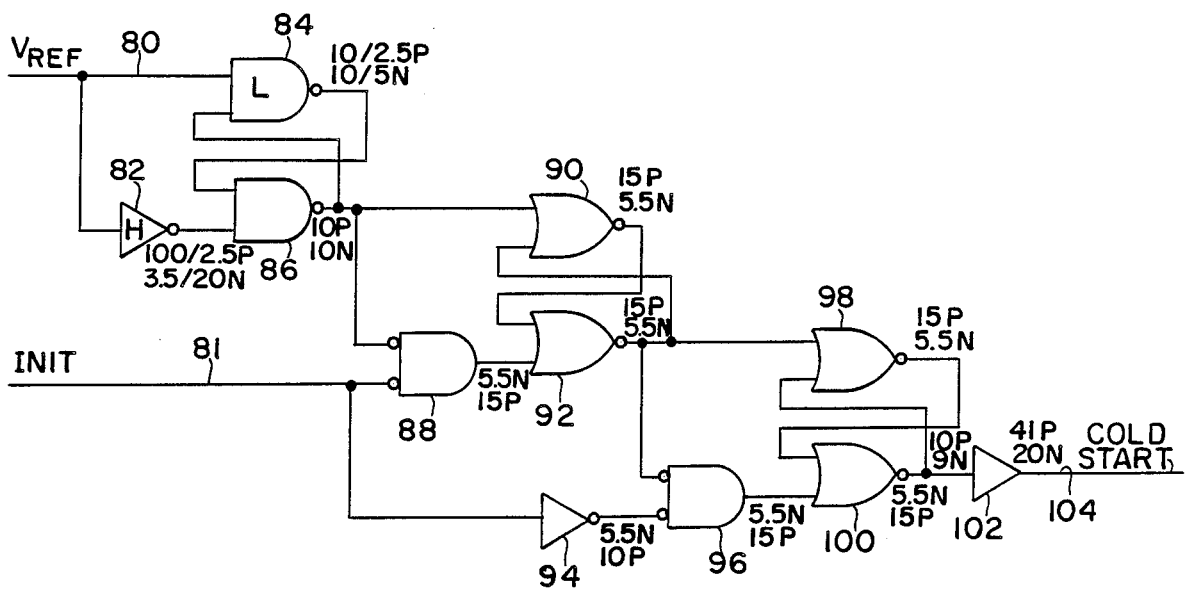
FIG. 3 is a block diagram of the cold start logic.

Refer to FIG. 3 for a block diagram of the cold start logic which distinguishes a cold INIT from a warm INIT. A cold INIT is defined to be the first INIT after a power up. The V-ref pin (80) is used for detecting a power up. A resistor/capacitor network onte V-ref pin will pull the pin above 2.0 v at the time of power up. The values of the network are such that they hold the V-ref pin above 2.0 v until the INIT signal has reached a stable LOW value. The V-ref input gates (82, 84, 86) are configured as a Schmitt trigger that detects the V-ref pin being above 2.0 v. After the INIT pin (81) stabilizes low, the output of the Schmitt trigger is latched in the master RS flip-flop (88, 90, 92) and the slave RS flip-flop (94, 96, 98, 100, 102). This asserts the ColdStart signal (104) which is used to determine that the next INIT assertion will be treated as a cold INIT. The V-ref pin must be below 2.0 v before the INIT pin is asserted so that when the master-slave RS flip-flop is enabled with INIT, it will latch ColdStart deasserted so that the next INIT will be treated as a warm INIT.

The first assertion of INIT after the V-ref pin has dropped below 2.0 v is treated as a COLD start. All other INITs will be treated as WARM starts. After the trailing edge of every INIT pulse, the WARM start bit in the FSC register will indicate if the initialization was warm or cold. The distinction between warm and cold INITs is used to control the FRC splitting logic, since an FRC split is allowed only on warm INITs.

Default Initialization

The BXU responds to the INIT signal by:

(1) Forcing all internal state machines to the idle state.

(2) Synchronizing its clock phase to the global system clock phase.

(3) Loading its registers with default values.

Figure 4:
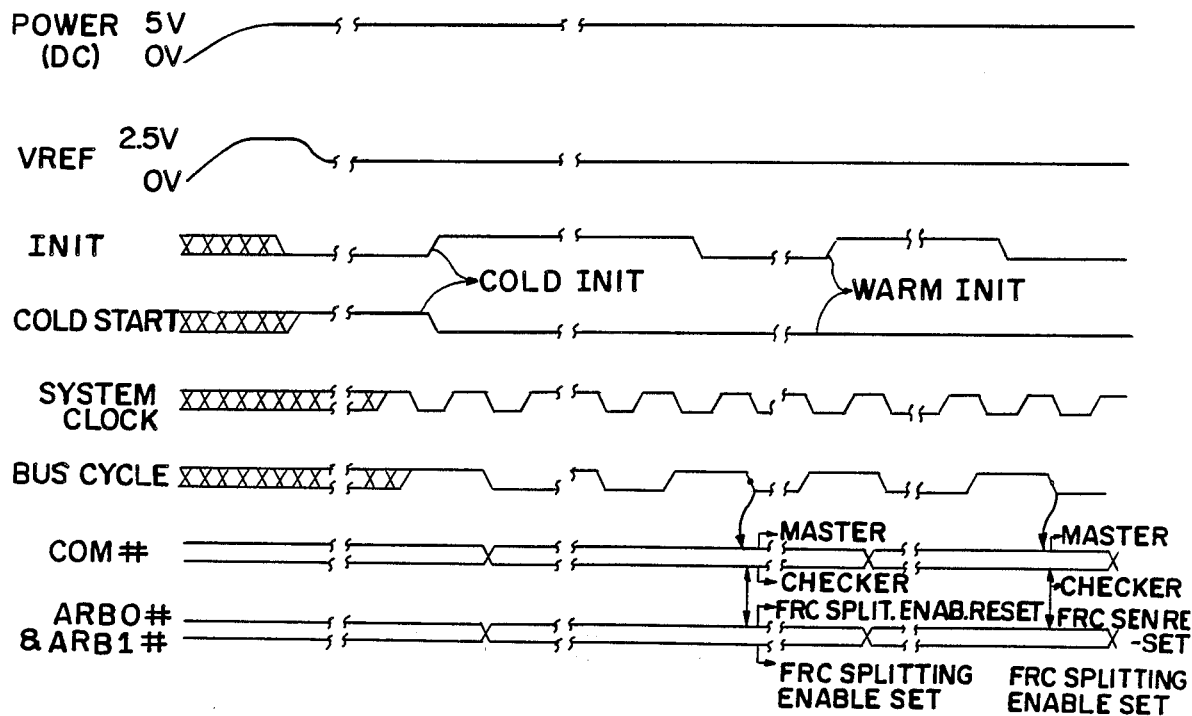
FIG. 4 is a signal timing diagram during an INIT sequence.

Refer to FIG. 4 which is signal timing diagram during an INIT sequence. The first falling edge of the system clock after INIT is asserted establishes the first phase of the AP bus cycle. The falling edge of the INIT signal resets all activity in progress. The rising edge of INIT loads the BXU (or other agent on the bus) with the default values as shown in FIG. 4. Defaults are as follows:

1. The state of the COM line selects whether the agent is a master or checker of an FRC pair.

2. If both ARB0 and ARB1 are asserted then the FRC SPLITTING ENABLE bit in the FT register is set.

3. If both ARB2 and ARB3 are asserted then the half-speed mode of the bus is selected.

4. If BOUT is asserted then the agent becomes an ICE component.

The non-asserted state of the bus lines provides the default value for a bus parameter unless an external source asserts the value during INIT.

While the invention has been particularly shown and described with reference to a preferred embodiment thereof, it will be understood by those skilled in the art that various changes in form and detail may be made therein without departing from the scope of the invention.

What is claimed is:

1. In an error-checking system in which two substantially identical modules (20, 22) connected to a common bus (23) are checked by comparing the outputs (43, 63) of chip logic (41, 61) on each module with each other, and wherein at any particular time one module is designated a master and the other module is designated a checker, and wherein said outputs (43, 63) are checked by means of a comparator (46 or 66) on said one module designated as a checker, the improvement in at least one of said modules (20) comprising:

control logic (50) including first means (FRC reg. bit 0: MASTER) for designating said module as either a master or a checker and second means (FRC reg. bit 1: TOGGLE MASTER/CHECKER) for indicating, when in a first state, that a module designated as a master continuously drives said bus, and when in a second state that a module designated as a master and a module designated as a checker alternately drive said bus;

third means (FSC reg. bit 2: PASSIVE and driver-44) for preventing said chip logic (41) of said module (20) from driving the output (24) thereof;

fourth means (FSC reg. bit 4: MY PERMANENT ERROR) for indicating that said module has detected a permanent error;

said control logic (50) further including fifth means (FIG. 3) for distinguishing a warm initialization from a cold initialization and sixth means (FSC register bit 0: FRC SPLITTING DISABLE);

said control logic (50) further including seventh means (FSC reg. bit 1: SEPARATED M/C) responsive to said fourth means (FSC reg. bit 4: MY PERMANENT ERROR), said fifth means (FIG. 3), and said sixth means (FSC register bit 0: FRC SPLITTING DISABLE) for setting said seventh means (FSC reg. bit 1: SEPARATED M/C) to thereby indicate that said module (20) is logiclly separate from said other module (22), and for activating said third means (FSC reg. bit 2: PASSIVE and driver-44), to thereby prevent said chip logic (41) of said module (20) from driving said output (24).

* * * * *